Sept. 30, 1941. W. BROWN Re. 21,909

EYELENS BRACE AND PROTECTOR

Original Filed May 2, 1939

INVENTOR.
William Brown.

BY Harry Langsam
ATTORNEY.

Reissued Sept. 30, 1941

Re. 21,909

UNITED STATES PATENT OFFICE 21,909

EYELENS BRACE AND PROTECTOR

William Brown, Wilkes-Barre, Pa., assignor to The Ful-Vue Sales Company, Providence, R. I.

Original No. 2,197,682, dated April 16, 1940, Serial No. 271,289, May 2, 1939. Application for reissue June 20, 1941, Serial No. 399,042

7 Claims. (Cl. 88—41)

My invention relates to spectacles and relates particularly to strengthening rimless eyeglasses by adding a neat appearing brace thereto.

Rimless eyeglasses have been used for many years, and rimless eyeglasses wherein each lens has two bolts therethrough are also common. Each rimless eyeglass lens usually has a nose bridge holding strap bolt and a temple holding strap bolt therein, and the loosening of one or both of the bolts as well as the strain placed on the lens frequently results in the breaking of the lens.

Therefore, it is an object of my invention to provide a detachable brace for rimless eyeglasses wherein the brace may be used on new or old eyeglasses.

Another object of my invention is to provide an eyeglass brace and protector for rimless eyeglasses which may overhang the top periphery or rim of the lens, or it may be parallel to the top periphery or rim of the lens.

Other objects of my invention are to provide an improved device of the character described, that is easily and economically produced, which is sturdy in construction and which is highly efficient in operation.

With the above and related objects in view, my invention consists in the following details of construction and combination of parts, as will be more fully understood from the following description, when read in conjunction with the accompanying drawing, in which.

Figure 1:
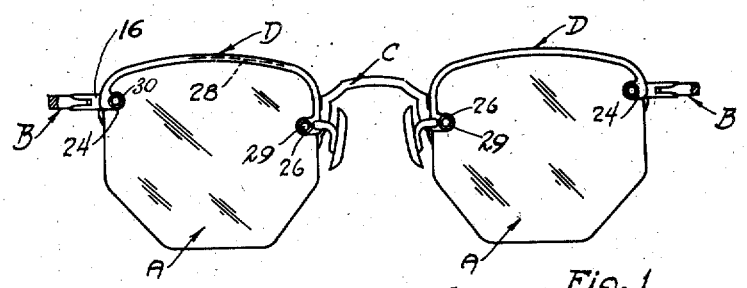
Fig. 1 is a rear view of rimless eyeglasses embodying my invention.
Figure 2:
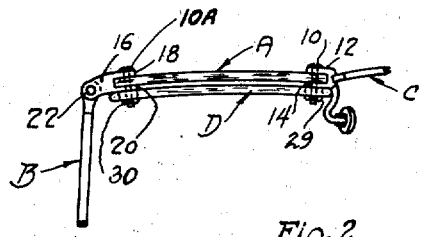
Fig. 2 is a top view of one of the lenses shown in Fig. 1.
Figure 3:
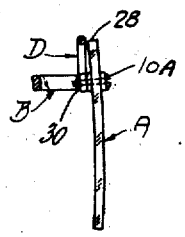
Fig. 3 is a side view of the lens shown in Fig. 2.

Referring now in greater detail to the drawing, I show a pair of rimless eyeglass lenses, each lens being generally designated as A. There are two temples, each of which is designated as B, and a nose bridge, generally designated as C, connected to the lens and adapted to be positioned upon the nose of the wearer.

Although eyeglasses have two lenses the explanation in this specification will apply to but one lens since each lens is arranged symmetrically about a vertical center plane, one lens being for the right eye and the other lens being for the left eye. Similar character designations designate similar parts throughout the specification.

The nose bridge C has one end connected to the lens by means of a screw bolt 10 passing through aligned openings in parallel straps 12 and 14 as well as passing through an opening in the lens. A rim strap which supports a nose rest as well as the nose bridge abuts the lens. The holding bolt 10 is longer than the combined thickness of the two parallel straps 12 and 14 and the lens A for a purpose which hereinafter will be described.

The temple B is joined to the lens A by means of a temple arm 16 which is placed high on the side periphery of the lens by means of the temple arm straps 18 and 20 abutting against a portion of the surface of the lens. A bolt 10A passes through aligned openings in the parallel straps 18 and 20 as well as through the lens A. The temple arm 16 pivotally supports temple B, as at 22.

Figure 4:
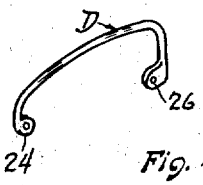
Fig. 4 is a perspective view of a brace embodying my invention.
Figure 5:
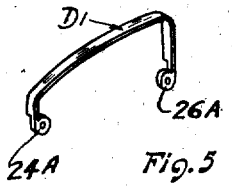
Fig. 5 is a perspective view of another embodiment of my invention.

In the above description the lens is of the customary rimless type. In order to prevent the lens from breaking and in order to serve as a lock washer for the holding bolts which may oscillate and loosen, I provide a rim brace, generally designated as D, which has two eyes or loops 24, 26, one at each end thereof, in order to fit on the holding bolts. The brace D is either circular in cross section, as in Fig. 4, or the brace may be of flat metal, as in Fig. 5, the brace in Fig. 5 being designated as D1.

Figure 6:
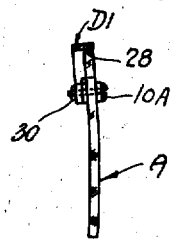
Fig. 6 is a side view of the brace shown in Fig. 5 embodied on a lens wherein the brace overlaps the top of the lens.

In order to enhance the appearance of the glasses, the brace D may be arranged to be aligned with the top edge of the lens, or brace D1 may be arranged so that it overlaps the top edge 28 of the lens, as in Fig. 6. Thus, it is seen that a pair of rimless glasses is strengthened in a manner whereby the brace will not be noticeable to an observer and wherein an inexpensive brace can be readily clamped to substantially each end of the lens.

The braces D and D1 have eyes or loops 24, 24A, and 26, 26A at each end thereof which fit upon bolts 10 and 10A, respectively. In view of the additional thickness of the braces at its ends, the bolts must be of sufficient length to accommodate the additional thickness when the parts are assembled and holding nuts 29 and 30 are tightened upon the bolts.

The brace is resilient to a sufficient degree to prevent the lens from being mounted in a rigid manner, otherwise, the bending of the brace would result in the breaking of the lens. The lens brace and protector also has the advantage of being adapted for use upon full-view glasses, and the ends of the brace may also be shaped to serve as lock washers when the holding nuts 29, and 30 are tightened thereagainst.

The brace may be applied to either new or to old rimless eyeglasses.

My invention also may be used to temporarily keep a broken lens together while the user or patient is having a new lens made. The advantage of my invention becomes apparent in those cases where the lens becomes broken, as by a crash, because the broken parts do not fly freely to cut the wearer.

This invention may be readily applied to lens such as the one shown in my Design Patents No. 96,156 and No. 96,157 of July 9, 1935.

A summary of the applicability of my invention will become apparent by an inspection of the drawing as well as the following description: the nose bridge, the lens, the temple holders and the temple may be of the customary construction; however, the threaded bolt which passes through the lens, the parallel holding straps and the loop at the end of the brace should preferably be longer to accommodate the thickness of the brace loop. Then a holding nut may be placed on the bolt to abut the brace loop in order to push the brace loops against one of the straps. Any stress or strain within reasonable limits will be absorbed by the brace and not the holding bolts, thus decreasing the liability of the lens to crack.

Although my invention has been described in considerable detail, such description is intended as illustrative rather than limiting, since the invention may be variously embodied, and the scope of the invention is to be determined as claimed.

I claim as my invention:

1. In eyeglass construction, in combination, a pair of lenses, a bridge disposed between said lenses, said bridge being provided with parallel straps at its outer ends, for engagement with a portion of the lenses, temples pivotally connected to temple arms, said temple arms being provided with parallel straps at one end thereof for engagement with the lenses; a rim brace disposed about the upper section of said lenses but not contacting any part of said lenses, the outer ends of said rim brace adapted to overlie one of the parallel straps of the said temple and bridge, and securing means extending through said parallel straps, lenses and rim brace for securing the elements together.

2. In eyeglass construction, in combination, a pair of lenses, a bridge disposed between said lenses, said bridge being provided with parallel straps integral with and extending outwardly of said bridge for engagement with a portion of the lenses, temples pivotally connected to temple arms, said temple arms being provided with parallel straps at one end thereof for engagement with the lenses; a rim brace of the same general contour as the top section of the lenses disposed rearwardly of said lenses, the outer ends of said rim brace positioned over one of the straps of said bridge and temple arms, and means extending through said parallel straps, lenses and rim brace for detachably securing the elements together.

3. In eyeglass construction, a pair of lenses, a bridge therefor, said bridge being provided with means at its outer ends for engagement with a portion of the lenses, a rim brace for each lens of a shape following the contour of the upper portion of the lens but not contacting any part thereof, the inner opposed ends of the said braces overlying the said means at the bridge ends, single means extending through the aforesaid means at each bridge end, lens and the overlying end of the rim brace for detachably securing the elements together, means underlying the outer end of each rim brace to space the latter from the adjacent lens and single means extending through the outer end of each rim brace, spacing means and lens for detachably securing the elements together.

4. An ophthalmic mounting comprising a pair of lenses, lens holding means secured on the nasal and temporal sides of the vertical center lines of the respective lenses, said lens holding means each having a side portion overlying a side surface of the lens, a bridge member joining the lens holding means on the nasal sides of the lenses, temples secured to the lens holding means on the temporal sides of the lenses and a relatively long and slender detachable brace bar shaped substantially to follow the upper contour edge of each lens and having end portions shaped to engage a side surface of each of the side portions of the respective lens holding means on the nasal and temporal sides of each lens and means securing the ends of the brace bar and the respective side portions of the lens holding means to said lenses with the said securing means disposed in a direction substantially normal to the plane of the lenses, whereby strain introduced by flexing the temples outwardly in a direction substantially normal to the plane of the lenses will be resisted by the brace bars through the non-shearing and clamping action of the means connecting the respective ends of said brace bars and the respective lens holding means to the lenses.

5. An ophthalmic mounting comprising a pair of lenses each having connection perforations on the nasal and temporal sides of the vertical center lines of said lenses, lens holding means each having a perforated ear overlying a side surface of the lenses with the perforation in each ear substantially aligned with the respective connection perforation in the lenses, a securing element extending through said aligned perforations for securing the respective lens holding means to the lenses, a bridge member joining the lens holding means on the nasal sides of the lenses, temples joined with the lens holding means on the temporal sides, relatively long and slender brace bars having flared perforated portions adjacent each of the ends thereof, said flared perforated portions being fitted to engage a side surface of the respective ears of the lens holding means with the securing elements extending through the perforations in said flared portions, the intermediate long and slender portion of each of said brace bars being shaped substantially to the upper contour shape of the respective lenses and means connected with each of said securing elements for clampingly securing the flared ends of said relatively long and slender brace bars to the ears of said lens holding means whereby strain introduced by flexing the temples outwardly in a direction substantially normal to the plane of the lenses will be resisted by the inherent rigidity of the brace bars and their tendency to prevent sidewise deflection of said flared ends relative to said bars and through the non-shearing action of the securing elements and the clamping action of the means connecting said flared ends to the respective ears of the lens holding means.

6. A braced construction for mounting a pair of eyeglass lenses comprising a nose bridge provided on each side of the nose with a pair of straps for overlying the front and rear faces of the corresponding lens, said lens and straps being perforated and connected together by a securing element extending therethrough, a temple arm similarly connected to each of the lenses at the outer portion thereof, temples pivotally connected to said temple arms, and a rim brace following the upper contour edge of each of the lenses behind the plane of the lenses, each brace being provided with perforated ends made fast to the rear straps of the bridge and temple arm respectively by said securing elements, whereby strain introduced by flexing the temples outwardly in a direction substantially normal to the plane of the lenses will be resisted by the brace bars through the non-shearing action of said securing elements.

7. A detachable rim brace for use with rimless spectacles comprising a bridge and a pair of temple arms with temples pivotally connected thereto, the bridge and each of the temple arms having as a lens conection a perforate strap adapted to overlie the lens in alignment with a perforation through the lens and connected to the lens by a securing element passed through the perforations in the strap and lens, said rim brace being shaped to lie at the back of the lens and substantially follow the upper contour edge thereof and having one of its ends perforated in alignment with the securing element of the bridge strap and its other end perforated in alignment with the securing element of the temple arm strap, said rim brace when assembled with the rimless spectacles being rigidly connected with the bridge and temple arm straps by said securing elements, whereby strain introduced by flexing the temples outwardly in a direction substantially normal to the plane of the lenses will be resisted by the brace bars through the non-shearing action of said securing elements.

WILLIAM BROWN.